Figure 1:
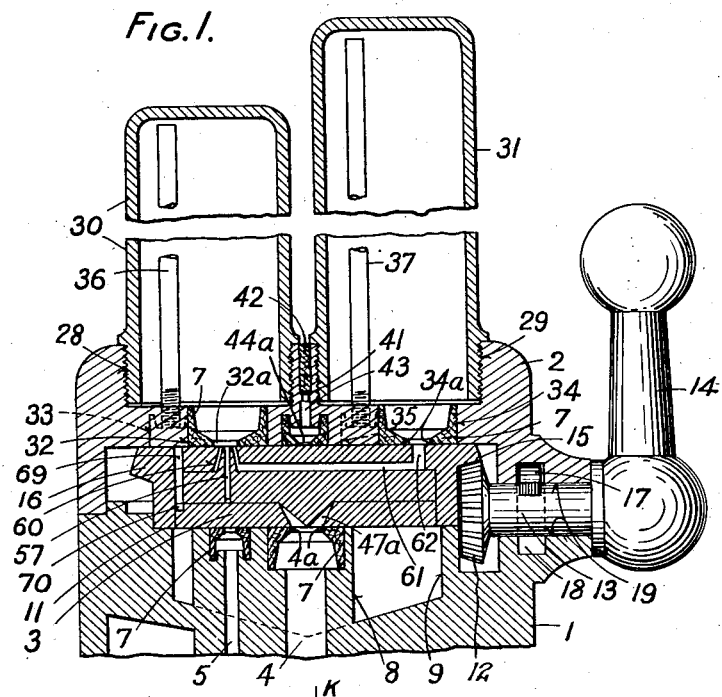

Dec. 1, 1936.  G. S. HIGGINSON  2,062,994

APPARATUS FOR AERATING LIQUIDS

Filed Dec. 27, 1932   5 Sheets-Sheet 1

George Seymour Higginson.
*Inventor:*

By _____ Attorney

Dec. 1, 1936. G. S. HIGGINSON 2,062,994
APPARATUS FOR AERATING LIQUIDS
Filed Dec. 27, 1932 5 Sheets-Sheet 2

George Seymour Higginson
Inventor:
By Attorney

Dec. 1, 1936.　　　G. S. HIGGINSON　　　2,062,994
APPARATUS FOR AERATING LIQUIDS
Filed Dec. 27, 1932　　　5 Sheets-Sheet 3

George Seymour Higginson
Inventor:
By　　　Attorney

George Seymour Higginson
Inventor

By _____ Attorney

Dec. 1, 1936.  G. S. HIGGINSON  2,062,994
APPARATUS FOR AERATING LIQUIDS
Filed Dec. 27, 1932  5 Sheets-Sheet 5

George Seymour Higginson
Inventor

By  Attorney

Patented Dec. 1, 1936

2,062,994

UNITED STATES PATENT OFFICE 2,062,994

APPARATUS FOR AERATING LIQUIDS

George Seymour Higginson, London, England, assignor to Julius C. Vredenburg, London, England Application December 27, 1932, Serial No. 649,039
In Great Britain August 6, 1932

1 Claim. (Cl. 251—87)

This invention relates to apparatus for aerating liquids, for example, for the manufacture of aerated water and the like and delivering it into bottles or into glasses for immediate consumption, of the kind in which the flow of liquid and gas into and out of the apparatus is controlled by a movable plate or disc located between two members, various passages contained in said plate or disc communicating through ports on its faces, in appropriate succession, with mouths or ports of passages through said members as the plate or disc is moved into different positions.

The object of the invention is to provide a simple, efficient, reliable, safe and inexpensive machine or apparatus of the kind referred to.

It is an important feature of the invention that the principal parts of the machine be made of a non-metallic material, preferably a material capable of being moulded under the action of heat and pressure to the exact finished shape and dimensions required. Particularly suitable are moulded materials comprising condensation products of urea, thio-urea or phenol and an aldehyde.

In aerating machines for the purpose specified the parts of the apparatus come in contact with liquids and gases which are corrosive to metal. For instance, ordinary water will rust iron and ferrous metals and also most of the light metals, such as aluminum and its alloys which might possibly be used in apparatus of this kind. When carbon dioxide is the gas used, this acts as an acid and also corrodes such metals. In addition if syrups such as fruit flavors are used, the acidity thereof also corrodes the various metals. It might be possible to use the expensive alloy steels containing chromium, nickel, tungsten and the like, but such alloys are very hard and tough and are not only expensive, but are difficult to machine, so that the use thereof in apparatus of the present type becomes a practical impossibility.

All these disadvantages are intensified by the complicated character and the comparatively large number of passages of small diameter which are found in the moving parts, particularly in the valve disc of the apparatus. In such case the corrosion will quickly close the passages and render the device useless.

The present invention is based upon the discovery, after long experimentation with certain non-metallic materials that heat hardened resinous masses made from urea and formaldehyde, thio-urea and formaldehyde or mixed resins of this type are eminently adapted for the purpose. There is also available resins made from phenols and formaldehyde, but such resins must be substantially free from free phenols, in order to avoid contamination of the aerated liquid. In addition, the moulded material must be such that it imparts no odor, color or taste to the aerated liquid.

It is, therefore, possible to use other moulded materials than those specifically set forth above provided that the properties thereof are those mentioned herein.

It is of considerable advantage in the manufacture of the apparatus to make the several parts thereof, particularly the disc valve and surrounding parts, of the non-metallic moulded material, because one may first make a mould which is very accurate and, although, it may be expensive, it may be used for the production by a very cheap method of many thousands of devices, whereby the cost of manufacture is extremely low. It avoids to a very large extent the necessity for machining operations, and if desired the moulded parts may be made of such character that no machining at all is necessary. This would give an appreciable saving in cost as compared with the cost of corresponding parts made of a ferrous or non-ferrous metal, which would need expensive machining to give them the accuracy required for successful operation.

Other features of the invention are hereinafter described and will be more particularly pointed out in the appended claim. In the accompanying drawings:—

Figure 2:
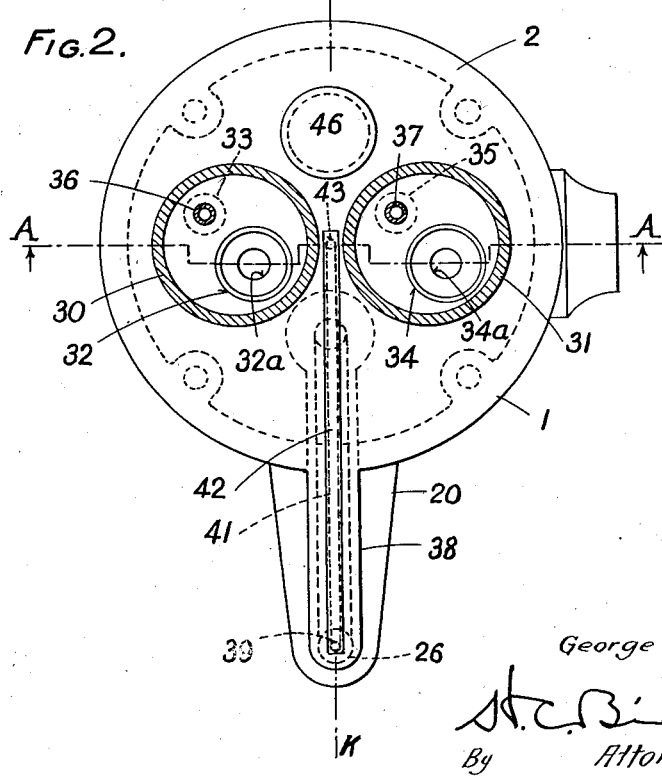
Figure 3:
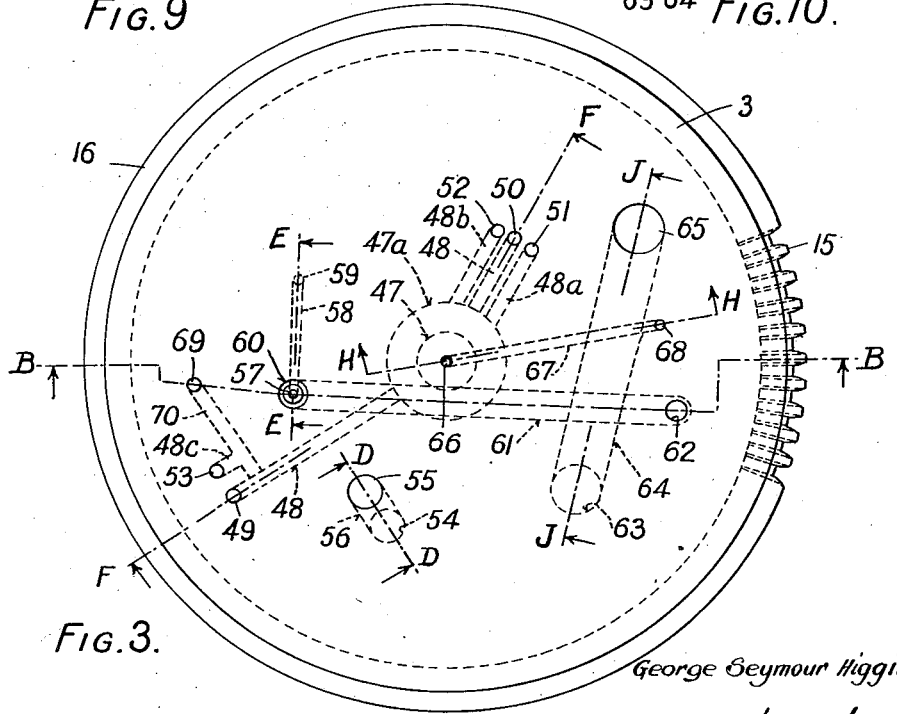
Figure 4:
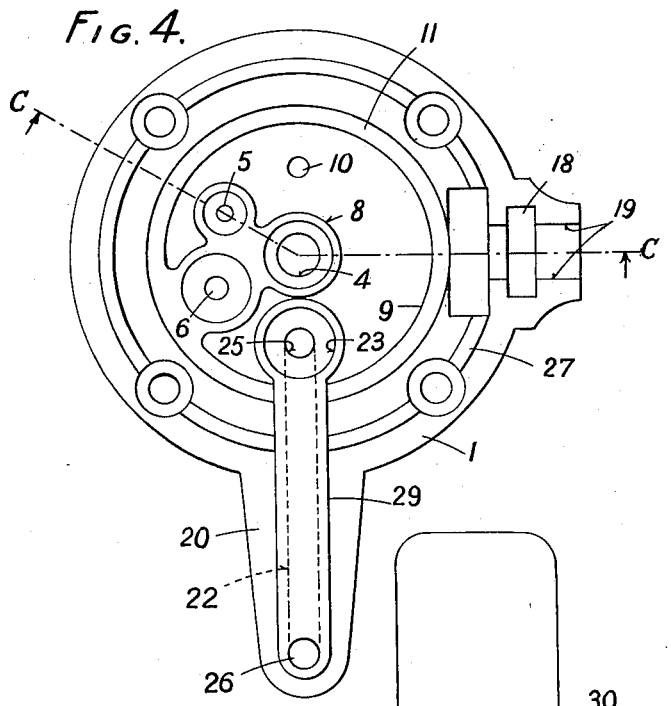
Figure 5:
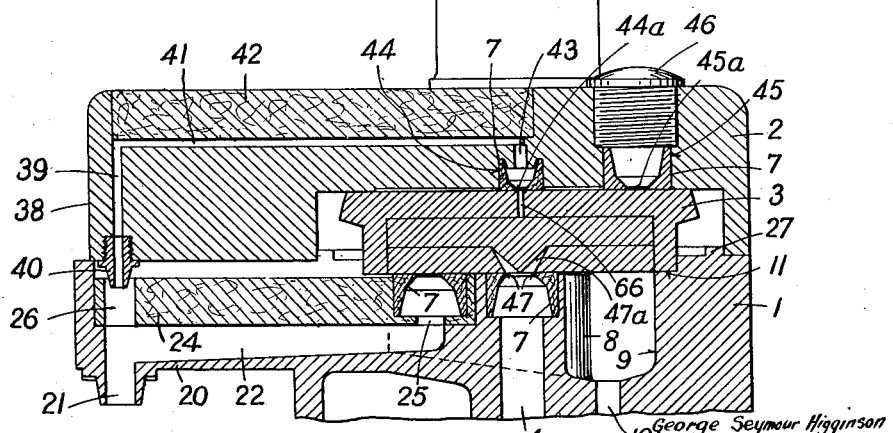
Figure 13:
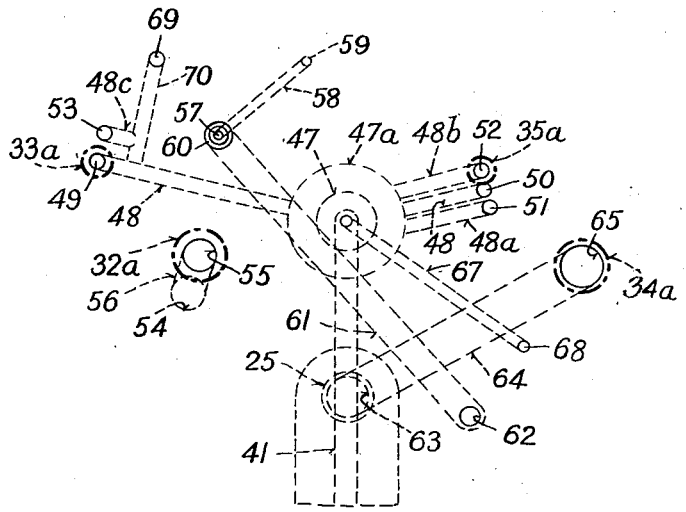
Figure 14:
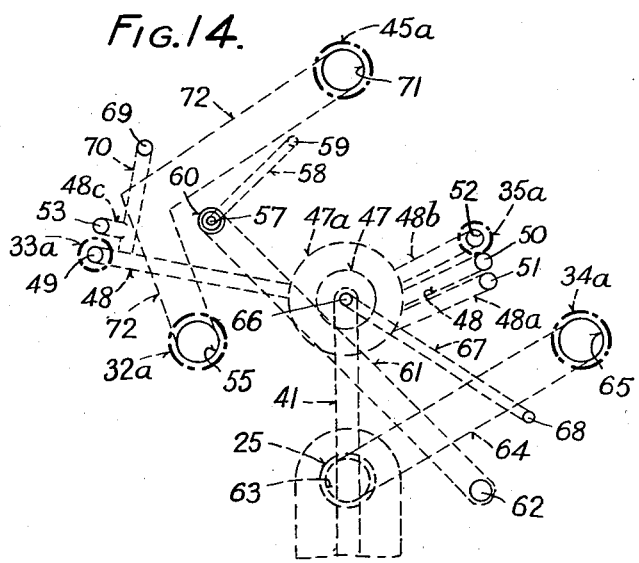

Fig. 1 is a composite vertical section of one form of the apparatus according to the present invention, the section of the upper member being taken on the line A—A of Fig. 2, the section of the disc valve being taken on the line B—B of Fig. 3 and the section of the lower member being taken on the line C—C of Fig. 4, Fig. 2 is a plan view of the apparatus, partly in section, Fig. 3 is a plan view of the disc valve, drawn to a larger scale, Fig. 4 is a plan view of the lower member of the apparatus, Fig. 5 is a vertical section taken on the line K—K of Fig. 2, Fig. 6 is a fragmentary vertical section taken on the line D—D of Fig. 3, Fig. 7 is a fragmentary vertical section taken on the line E—E of Fig. 3, Fig. 8 is a vertical section taken on the line F—F of Fig. 3, Fig. 9 is a fragmentary vertical section taken on the line H—H of Fig. 3, Fig. 10 is a fragmentary vertical section taken on the line J—J of Fig. 3, Figs. 11, 12 and 13 are diagrammatic plan views of the disc valve in various positions, and Fig. 14 is a view similar to Fig. 13 of a modification.

As shown, the apparatus comprises a base or lower member 1, an upper member 2 and a disc valve 3, all formed by moulding operations from a non-metallic material, preferably a urea-aldehyde condensation product. In the example shown the disc valve is composed of three sections which are cemented together, this facilitating the formation by moulding of the necessary passages and ports extending therethrough but the disc valve may, if desired, be a unitary moulding having some of the passages formed therein by boring operations.

The substantially cylindrical lower member 1 has vertically extending passages 4, 5 and 6 formed therein and adapted to be connected at their lower ends to waste, compressed-gas supply and water supply, respectively. The upper ends of these passages are bored out to receive packing elements of known form, such as shown at 7 for the passages 4 and 5, Fig. 1. As can be seen from Figs. 1, 4 and 5, the upper portions of the passages 4, 5 and 6 are formed in an upstanding boss 8, substantially trefoil-shaped in plan, which is surrounded by a sump 9 into the bottom of which opens the upper end of an auxiliary waste or drain passage 10 adapted to be connected at its lower end to the main waste, as through a flexible tube (not shown).

Around the upper edge of the vertical wall of the sump 9 there is formed an annular shoulder or seating 11, concentric with the passage 4, adapted to receive the lower edge of the valve 3 and support same so that its lower surface may be rotated in contact with the upper surfaces of the packing elements 7 in the mouths of the passages 4, 5 and 6.

The means for rotating the valve 3 comprise, in the example shown, a bevel pinion 12, formed or secured on a shaft 13 having a handle 14, engaging with teeth 15 formed on a bevelled flange 16 extending outwardly from the upper edge of the valve 3. A suitable stop 17 formed on the shaft 13 coacts with another stop (not shown) disposed in a groove 18 formed in the bearing 19 for the shaft to limit the rotation of registers with the opening 32a.

As seen more clearly from Figs. 4 and 5, the lower member 1 is formed with a radially extending portion 20 having at its outer end a downwardly directed discharge nozzle 21. The portion 20 is moulded with an open-topped groove 22 sloping downwardly to the nozzle 21 from beneath a substantially cylindrical chamber 23 formed in a fillet 24 which is moulded separately and inserted in a corresponding recess in the portion 20 to cover the groove 22 therein. A central aperture 25 in the base of the chamber 23 gives access to the groove 22 from the latter and a further aperture 26 in the outer end of the fillet 24 is disposed vertically above and co-axially with the nozzle 21. The chamber 23 is provided with a packing element 7 similar to those already mentioned.

Concentrically with the passage 4 and seating 11, there is formed on the upper surface of the lower member 1 an interrupted annular rib 27 (Fig. 5) serving to position the upper member 2 with respect to the said lower member, these members being suitably secured together by means of bolts or the like (not shown).

The upper face of the disc valve 3 is plane and contacts with the lower faces of the packing elements 7 disposed in various ports or apertures formed in the upper member 2.

Of these ports or apertures, two are comparatively large and two comparatively small, one of each being disposed in the base of a circular recess 28 or 29 formed in the upper surface of the member 2, the vertical cylindrical walls of these recesses being screw-threaded to receive the externally threaded open lower ends of vessels 30 and 31, respectively.

The larger port or aperture, marked 32, corresponding to the vessel 30 is provided with a packing element 7 having a free passage therethrough marked 32a (Fig. 1) and the smaller port or aperture, marked 33, corresponding to vessel 30 is similarly provided with a packing (not shown) having a free aperture hereinafter referred to by the reference 33a (Figs. 11 to 14). The corresponding ports and free passages for the vessel 31 are designated, respectively, 34, 34a, 35 and 35a.

In the upper portions of the smaller ports 33, 35, which portions are of reduced diameter in the example shown, are secured the lower ends of vertical tubes 36 and 37, respectively, which terminate at their upper ends just short of the inner surfaces of the tops of the vessels 30 and 31.

The upper member 2, which is substantially cylindrical in shape is also formed with a radial extension 38 adapted to be disposed over and substantially coincide with the outer portion of the fillet 24 secured in the portion 20 of the lower member 1. At its outer end this extension 38 is formed with a narrow vertical bore 39, co-axial with the nozzle 21 and having secured in its enlarged lower end a nozzle 40 projecting downwardly to extend partially into the aperture 26 formed in the fillet 24.

From the bore 39 there extends radially of the member 2 a narrow groove 41 closed on its upper side by an inserted fillet 42 to constitute a narrow passage leading to a vertical bore 43 extending downwardly from the passage centrally of the member 2 to open into a chamber 44 (Fig. 5) provided with a packing 7 having a free aperture 44a in that surface bearing on the upper face of the disc valve 3.

A further port or aperture 45 is formed in the upper member 2 to receive a packing 7 having a free aperture 45a in its lower end and is shown closed by a screw plug 46 at its upper end in Figs. 2 and 5. This plug is removed in certain circumstances, to be hereinafter referred to, so that the lower end of a further receptacle (not shown) may be arranged in the port 45 in its place.

Referring now to the disc valve 3 and Figs. 3, 11, 12 and 13.

The valve 3 is formed with a central opening 47 in its underside which is constantly in register with the free passage 4a through the packing 7 arranged in the mouth of the waste passage 4. This opening 47 gives access to an annular passage 47a formed part-way through the valve 3 and communicating through horizontal passages 48, extending radially of the valve, with the lower ends of vertical bores 49 and 50 which open at their upper ends on the upper face of the valve 3 (Fig. 8). The bore 49 and 50 are arranged so that they may be brought beneath the openings 33a and 35a, respectively, already referred to.

At the same radius as the bore 50 and adjacent thereto there is formed a similar bore 51 communicating through a horizontal passage 48a with the annular passage 47a and a further similar bore 52 communicating with the passage 47a through a horizontal passage 48b.

In a position relative to the bore 49 corresponding to that of the bore 51 with respect to the bore 50 there is formed a bore 53 communicating through a short horizontal passage 48c with a further horizontal passage 70 to be hereinafter referred to.

In the underside of the valve 3 is formed a bore 54 (Figs. 3 and 6) at a radius such that it may be brought over the opening of the water supply passage 6 and in the upper side of the valve there is formed a bore 55 at such a radius and in such a position that it may be brought beneath the opening 32a already referred to at the moment when the bore 54 registers with the passage 6, the bores 54 and 55 communicating with each other internally at the valve disc through a short horizontal passage 56.

At approximately the same radius as the port 55 there is formed a pair of concentric ports 57, 60 in the upper side of the disc 3, the inner circular port 57 communicating through a horizontal passage 58 with a vertical port 59 formed in the underside of the disc 3 at a position such that it may be brought into register with the compressed-gas supply passage 5 (Figs. 1, 3 and 7). The outer annular port 60, on the other hand, communicates through a horizontal passage 61 with a vertical port 62 opening into the upper surface of the disc 3 at a position such that it may be brought into register with the opening 34a (Fig. 1) at the moment when the port 60 registers with the opening 32a.

In the underside of the valve 3 is also formed a port 63 (Figs. 3 and 10) adapted to be brought vertically above the opening 25 (Fig. 5) and connected by an upwardly inclined passage 64 with a port 65 formed in the upper surface of the valve at a position such that it registers with the opening 34a when the port 63 is disposed above the opening 25.

Figure 11:
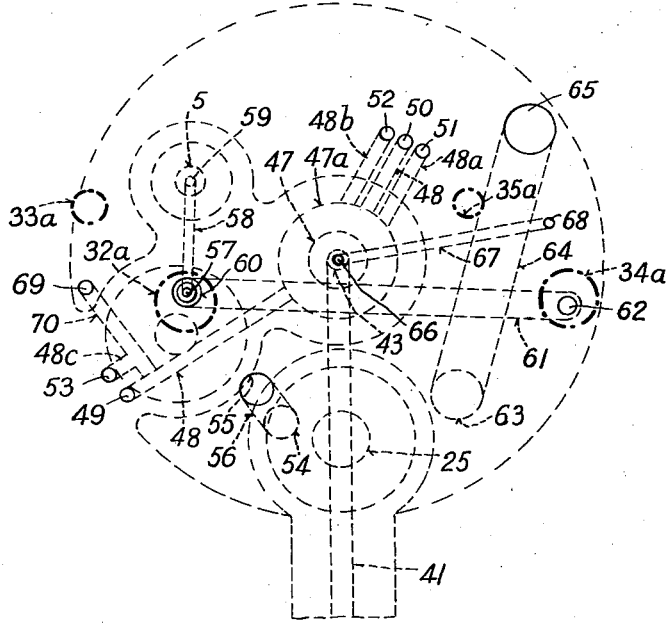
Figure 12:
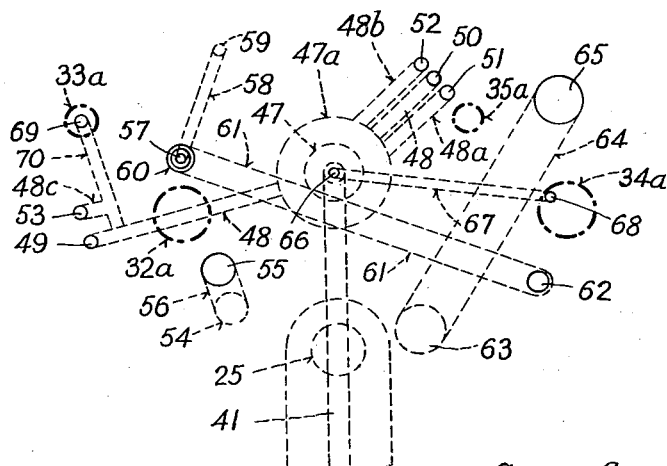

Centrally of the upper surface of the disc 3 is formed a vertical port 66 registering with the opening 44a already referred to and communicating through a horizontal passage 67 (Figs. 3 and 9) with a port 68 also formed in the upper surface of the disc and adapted to be brought into register with the opening 34a (Figs. 1 and 11).

Suitably disposed so that it registers with the opening 33a at the moment when the port 68 registers with the opening 34a is a port 69 (Figs. 1, 3 and 11) communicating through the passage 70, already referred to, with the passage 48 leading from the port 49 to the annular passage 47a formed centrally of the disc 3.

Although the specific positions of the ports and passages in the valve disc 3 have not been detailed in the above description thereof, it is thought that the following description of the manner in which the apparatus operates to supply aerated mineral water will suffice to indicate the relative positions of the said ports and passages.

The position of the valve disc 3 when the apparatus is standing at rest with the control handle 14 at one of its limit positions as indicated in Fig. 11. It will be seen that the concentric ports 57, 60 are disposed beneath the opening 32a, the port 59 is disposed over the compressed-gas supply passage 5 and the port 62 is disposed beneath the opening 34a. In this position the vessel 31 contains a charge of aerated water ready to be drawn off and the vessel 30 contains only gas under pressure.

On the first portion of the movement of the operating handle, which is such that the valve disc 3 moves clockwise, the supply of gas to the vessel 30 through the port 59, passage 58 and port 57 is cut off and the port 68 is brought beneath the opening 34a, the port 62 having simultaneously moved from beneath said opening. The position of the valve disc 3 is then that indicated in Fig. 12. In this position some of the aerated water in the vessel 31 is discharged under pressure through the port 68, passage 67, port 66, opening 44a, bore 43, passage 41, bore 39 and nozzle 40 in the form of a needle-like jet directed through the outlet nozzle 21 into a glass or the like held beneath same and containing a given quantity of syrup. The discharged aerated water therefore becomes intimately admixed with the syrup in the glass or the like. At the same time the port 69 has been brought beneath the opening 33a and some of the gas under pressure in the vessel 30 is snifted off through the port 69, passages 70, 48 and 47a to the waste pipe 4. It will be understood that the valve disc 3 is being moved while such discharging operations are occurring so that they are of short duration.

The continued movement of the handle 14 causes the needle-like jet to be cut off, traverses the ports 51 and 50 beneath the opening 35a, and the port 53 beneath the opening 33a, whereby the gas under pressure in the vessel 31 is momentarily snifted off in two stages through pipe 37, ports 51 and 50, passages 48a and 48 and passage 47a to the waste passage 4, and the gas under pressure in the vessel 30 is also momentarily snifted off through pipe 36, port 53, passages 48c, 70 and 48 and passage 47a to the passage 4, and then brings ports 49 and 52 beneath the openings 33a and 35a respectively, the ports 55 and 65 beneath the openings 32a and 34a, respectively, and the ports 54 and 63 above the water supply passage 6 and the opening 25, respectively. The valve 3 is then in the position shown in Fig. 13, the handle 14 being at its other limit position.

It will be seen that the two vessels 30 and 31 are now open to the atmosphere through the pipes 36 and 37, ports 49 and 52, passages 48, 48b, passage 47a and waste pipe 4, any gas under pressure which may still have been contained in the vessels therefore being discharged down to atmospheric pressure.

At the same time the charge of aerated water in the vessel 31 is discharged under the action of gravity through the opening 34a, port 65, passage 64, port 63, opening 25, passage 22 and nozzle 21 into the glass or the like held therebeneath, while water from the supply pipe or passage 6 flows through the port 54, passage 56, port 55 and opening 32a into the vessel 30.

On the handle 14 being moved back to its initial limit position the communications from the vessels 30 and 31 to the atmosphere, and to the water supply and discharge nozzle, respectively, are interrupted and the disc valve 3 is moved back (anti-clockwise) until it again reaches the position shown in Fig. 11.

Gas under pressure is immediately admitted from the pipe or passage 5 to the vessel 30, by way of the port 59, passage 58, port 57 and opening 32a (see Fig. 1) and this enters the water already contained in the vessel while simultaneously forcing it out therefrom, through the annular port 60, passage 61, port 62 and opening 35a, into the vessel 31.

Due to the concentric arrangement of the ports 57 and 60 a very effective and thorough intermixing of the gas under pressure with the water is brought about, the incoming stream of gas meeting the outgoing stream of water adjacent the opening 32a and aerating same instantaneously.

Upon the completion of the transfer of the water from the vessel 30 to the vessel 31 the cycle of operation is completed, the vessel 31 being again filled with a charge of aerated water ready to be drawn off.

In some cases, as for example when the aerated water is to be bottled, the snifting operations may be omitted and the bulk discharge effected under pressure.

An leakages of liquid which may occur within the housing 2, 1 collect in the sump 9 from which they drain away through the auxiliary drain passage 10.

The apparatus described may also be employed for aerating and delivering a charge of liquid other than water, for example, milk.

In this case the plug (Fig. 5) is removed from the mouth of the port 45 and an open-mouthed vessel (not shown) is screwed in the said mouth. This vessel, which is preferably graduated to act as a measure, is filled with the requisite quantity of milk and the normal water supply to the apparatus is interrupted, preferably by plugging the port 54.

The disc valve 3 has a further port 71 formed in its face at such a position that it registers with the opening 45a when the snifting ports 49 and 52 are operative (see Fig. 14), this port 71 communicating through an angular passage 72 in the valve body with the port 55 therein.

With the valve 3 in the position indicated in Fig. 14, the vessels 30 and 31 are open to the atmosphere in the manner already described with reference to Fig. 13 and the supply of milk from the open-topped vessel (not shown) flows by gravity, through the opening 45a, port 71, passage 72, port 55 and opening 32a into the vessel 30.

Further movements of the valve 3, in the manner already described, interrupt the communication between the open-topped vessel and the vessel 30, admit gas under pressure to the latter to aerate the milk and force it to the vessel 31, snift the vessels 30 and 31 to atmosphere and allow the aerated milk to discharge from the vessel 31 under the action of gravity, through the nozzle 21, into a glass or the like.

Similarly, a further vessel containing yet another liquid may be provided whereby the milk or the like may be first driven into said vessel to be admixed with said liquid and the aerated mixture then discharged in the manner above described.

When the apparatus is employed as above indicated for aerating milk or the like it is preferred to provide an additional port (not shown) in the plate or disc for enabling communication to be established between the pipe leading from the open vessel for milk or the like and the waste pipe, so that hot water or other cleansing agent may be poured through the vessel and pipe to cleanse and/or sterilize same.

Having now particularly described and ascertained the nature of my invention and in what manner the same is to be performed, what I claim is:—

An apparatus for aerating liquids for beverage purposes which comprises a stationary body portion, a disc valve therein adapted to be rotated, the face of said disc making contact with said body portion, said valve and body portion having cooperating passages for fluids corrosive to metals, the parts thereof contacting with said fluids being of non-metallic material substantially resistant to corrosion, and a packing element in at least one of said cooperating passages, said element projecting beyond the surface of its seat so as to make positive contact with the surface of the adjacent member.

GEORGE SEYMOUR HIGGINSON.